US012388160B2

(12) United States Patent
Utsumi et al.

(10) Patent No.: US 12,388,160 B2
(45) Date of Patent: *Aug. 12, 2025

(54) BIPOLAR BATTERY STACK

(71) Applicant: TOYOTA JIDOSHA KABUSHIKI KAISHA, Toyota (JP)

(72) Inventors: Shintaro Utsumi, Susono (JP); Kazushige Nomoto, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 313 days.

This patent is subject to a terminal disclaimer.

(21) Appl. No.: 18/177,187

(22) Filed: Mar. 2, 2023

(65) Prior Publication Data

US 2023/0207993 A1    Jun. 29, 2023

Related U.S. Application Data

(63) Continuation of application No. 17/134,768, filed on Dec. 28, 2020, now Pat. No. 11,621,463.

(30) Foreign Application Priority Data

Feb. 26, 2020   (JP) .................................. 2020-030364

(51) Int. Cl.
  *H01M 10/04*    (2006.01)
  *H01M 10/613*   (2014.01)
  (Continued)

(52) U.S. Cl.
  CPC ..... *H01M 50/581* (2021.01); *H01M 10/0418* (2013.01); *H01M 10/044* (2013.01);
  (Continued)

(58) Field of Classification Search
  CPC .. H01M 50/581; H01M 50/54; H01M 50/562; H01M 50/574; H01M 50/578;
  (Continued)

(56) References Cited

U.S. PATENT DOCUMENTS

| 2009/0233164 A1 | 9/2009 | Shimamura et al. |
| 2018/0131035 A1 | 5/2018 | Hojo et al. |
| 2018/0205118 A1 | 7/2018 | Chu et al. |

FOREIGN PATENT DOCUMENTS

| JP | 2012248354 A | 12/2012 |
| JP | 2018077977 A | 5/2018 |

(Continued)

OTHER PUBLICATIONS

Shintaro Utsumi et al., U.S. Appl. No. 17/134,768, Restriction Requirement dated Sep. 27, 2022.

(Continued)

*Primary Examiner* — Eugenia Wang
(74) *Attorney, Agent, or Firm* — Dickinson Wright, PLLC

(57) ABSTRACT

Disclosed is a bipolar battery with which thermal deterioration of the electrode body due to the generation of heat of tabs can be suppressed. The bipolar battery of the present disclosure includes a first member, a second member, and a laminate electrode body arranged therebetween, wherein the laminate electrode body includes a first current collector constituting a lamination direction end surface, a second current collector constituting the other lamination direction end surface, at least one bipolar current collector arranged between the first current collector and the second current collector, and a plurality of power generating elements which are electrically connected in series via the bipolar current collector between the first current collector and the second current collector, the first current collector is arranged between the first member and the bipolar current collector, the second current collector is arranged between the second member and the bipolar current collector, the first current collector has a first tab, the second current collector has a second tab, an amount of heat generated by the first tab during energization of the battery is greater than an amount of heat generated by the second tab, the first member is a (Continued)

cooling member for cooling the first current collector, and a cooling performance of the first member is greater than a cooling performance of the second member.

3 Claims, 7 Drawing Sheets

(51) Int. Cl.
| | |
|---|---|
| *H01M 10/655* | (2014.01) |
| *H01M 10/6554* | (2014.01) |
| *H01M 10/658* | (2014.01) |
| *H01M 50/54* | (2021.01) |
| *H01M 50/562* | (2021.01) |
| *H01M 50/574* | (2021.01) |
| *H01M 50/578* | (2021.01) |
| *H01M 50/581* | (2021.01) |
| *H01M 50/583* | (2021.01) |

(52) U.S. Cl.
CPC ....... *H01M 10/613* (2015.04); *H01M 10/655* (2015.04); *H01M 10/6554* (2015.04); *H01M 10/658* (2015.04); *H01M 50/54* (2021.01); *H01M 50/562* (2021.01); *H01M 50/574* (2021.01); *H01M 50/578* (2021.01); *H01M 50/583* (2021.01); *H01M 2200/10* (2013.01)

(58) Field of Classification Search
CPC ........... H01M 50/583; H01M 10/0418; H01M 10/044; H01M 10/613; H01M 10/655; H01M 10/6554; H01M 10/658; H01M 2200/10
See application file for complete search history.

(56) References Cited

FOREIGN PATENT DOCUMENTS

| | | |
|---|---|---|
| JP | 2019036397 A | 3/2019 |
| WO | 2006062204 A1 | 6/2006 |

OTHER PUBLICATIONS

Shintaro Utsumi et al., U.S. Appl. No. 17/134,768, Notice of Allowance dated Dec. 15, 2022.

100

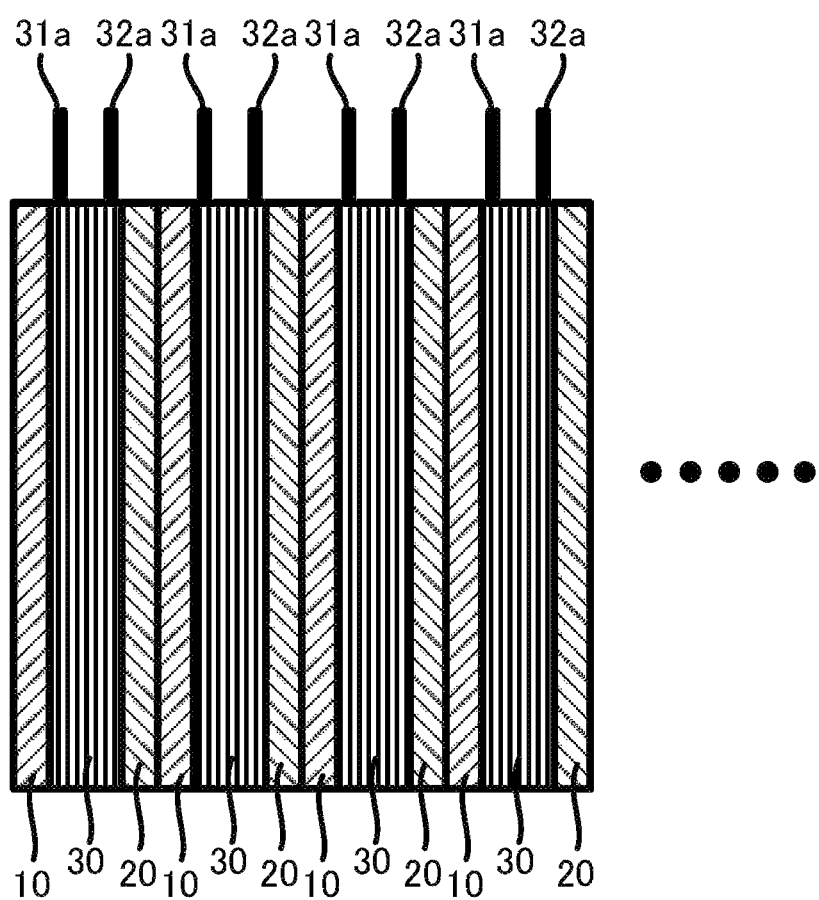

BIPOLAR BATTERY STACK

RELATED APPLICATION

This application is a continuation of U.S. patent application Ser. No. 17/134,768, filed Dec. 28, 2020, now U.S. Pat. No. 11,621,463, issued on Apr. 4, 2023, which claims priority to Japanese Patent Application No. 2020-030364, filed on Feb. 26, 2020, including the specification, drawings and abstract, the entire disclosure of which is incorporated herein by reference.

FIELD

The present application discloses a bipolar battery and a bipolar battery stack.

BACKGROUND

Patent Literature 1 discloses a bipolar battery comprising a plurality of bipolar electrodes laminated in series and electrolyte layers interposed therebetween, wherein each bipolar electrode comprises a positive electrode formed on one surface of a current collector and a negative electrode formed on the other surface thereof. In Patent Literature 1, outermost current collectors are provided on opposite ends of the plurality of bipolar electrodes in the lamination direction, and the outermost current collectors are connected to the respective tabs (leads).

Patent Literature 2 discloses a battery pack in which cooling members are provided between unit cells. Furthermore, Patent Literature 3 discloses a battery cooling system, wherein an electrode block is arranged between battery electrode tabs, a cooling member is put in contact with the electrode block, and the electrode tabs are cooled via the electrode block.

CITATION LIST

Patent Literature

[PTL 1] WO 2006/062204
[PTL 2] Japanese Unexamined Patent Publication No. 2019-036397
[PTL 2] Japanese Unexamined Patent Publication No. 2012-248354

SUMMARY

Technical Problem

In accordance with the new findings of the present inventors, in bipolar batteries as disclosed in Patent Literature 1, during energization of the battery, the tabs connected to the outermost current collectors generate heat, and the heat may diffuse from the tabs toward the interior of the electrode body via the outermost current collectors. In other words, there is a risk of thermal deterioration of part of the electrode body due to the heat generated by the tabs. Furthermore, in accordance with the new findings of the present inventors, the amount of heat generated during energization of the battery differs between the positive electrode side tab and the negative electrode side tab provided in the bipolar battery. Thus, it is considered that the above thermal deterioration is likely to occur in the vicinity of the outermost current collectors connected to the tabs, which generate significant quantities of heat.

Solution to Problem

As one means for solving the above problem, the present application discloses:
a bipolar battery, comprising a first member, a second member, and a laminate electrode body arranged between the first member and the second member, wherein
the laminate electrode body comprises a first current collector constituting a lamination direction end surface, a second current collector constituting the other lamination direction end surface, at least one bipolar current collector arranged between the first current collector and the second current collector, and a plurality of power generating elements which are electrically connected in series via the bipolar current collector between the first current collector and the second current collector,
the first current collector is arranged between the first member and the bipolar current collector,
the second current collector is arranged between the second member and the bipolar current collector,
the first current collector has a first tab,
the second current collector has a second tab,
an amount of heat generated by the first tab during energization of the battery is greater than an amount of heat generated by the second tab,
the first member is a cooling member for cooling the first current collector, and
a cooling performance of the first member is greater than a cooling performance of the second member.

In the bipolar battery of the present disclosure, the first tab may have a shutdown mechanism.

In the bipolar battery of the present disclosure, the second member may be a heat insulating member.

As one means for solving the above problem, the present application discloses a bipolar battery stack comprising a plurality of the above bipolar batteries of the present disclosure.

In the bipolar battery stack of the present disclosure, the second member of one of the bipolar batteries may be laminated on the first member of another bipolar battery.

In the bipolar battery stack of the present disclosure, the first member of one of the bipolar batteries may be laminated on the first member of another bipolar battery.

In the bipolar battery stack of the present disclosure, the first member is shared by one of the bipolar batteries and another of the bipolar batteries.

Advantageous Effects of Invention

According to the technology of the present disclosure, the outermost current collector (first current collector) which is connected to the first tab, which generates significant amounts of heat during energization, can be cooled by the first member. In other words, even when heat is generated by the first tab, the heat is unlikely to spread from the first tab toward the interior of the laminate electrode body via the first current collector, whereby thermal deterioration of the laminate electrode body due to the heat generated by the tab can be suppressed.

BRIEF DESCRIPTION OF DRAWINGS

FIG. 4A is a schematic view detailing the laminate structure of the bipolar battery stack shown in FIG. 3. The exterior body has been omitted.

DESCRIPTION OF EMBODIMENTS

1. Bipolar Battery

Figure 1:
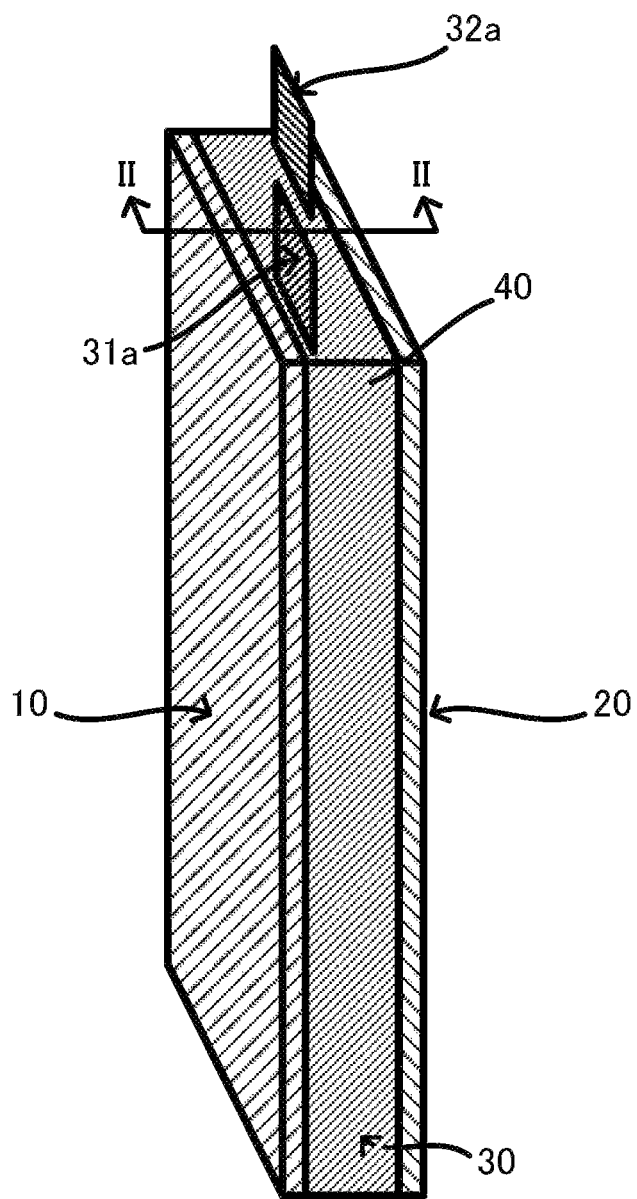
FIG. 1 is a schematic view showing an example of the appearance of a bipolar battery.
Figure 2:
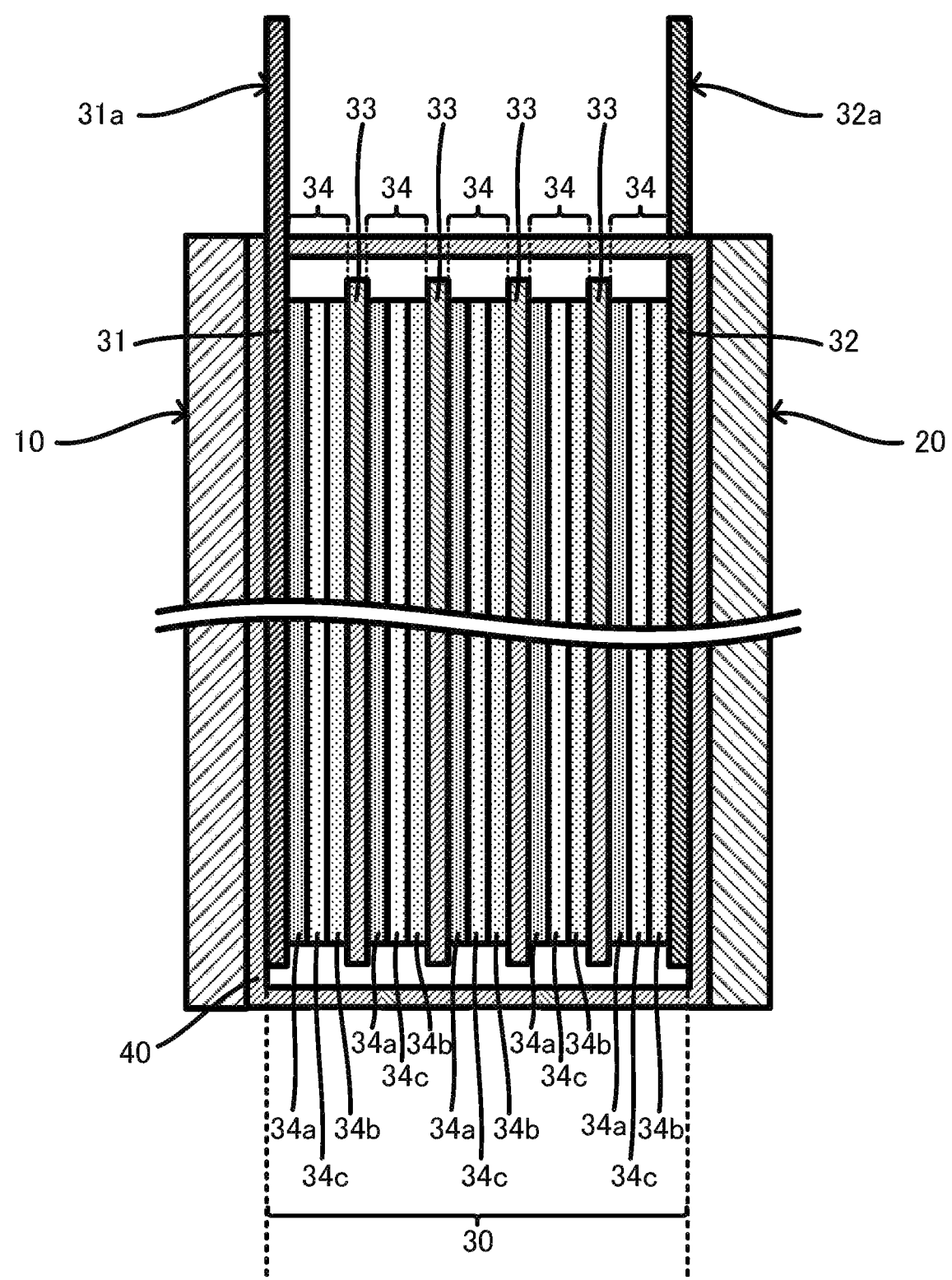
FIG. 2 is a schematic view showing the structure of a cross-section taken along line II-II of FIG. 1.

The structure of a bipolar battery 100 is schematically illustrated in FIGS. 1 and 2. The bipolar battery 100 comprises a first member 10, a second member 20, and a laminate electrode body 30 arranged between the first member 10 and the second member 20. The laminate electrode body 30 comprises a first current collector 31 constituting a lamination direction end surface, a second current collector 32 constituting the other lamination direction end surface, at least one bipolar current collector 33 arranged between the first current collector 31 and the second current collector 32, and a plurality of power generating elements 34 which are electrically connected in series via the bipolar current collector 33 between the first current collector 31 and the second current collector 32. The first current collector 31 is arranged between the first member 10 and the bipolar current collector 33. The second current collector 32 is arranged between the second member 20 and the bipolar current collector 33. The first current collector 31 has a first tab 31a. The second current collector 32 has a second tab 32a. During energization of the battery 100, the amount of heat generated by the first tab 31a is greater than an amount of heat generated by the second tab 32a. The first member 10 is a cooling member for cooling the first current collector 31. The cooling performance of the first member 10 is greater than the cooling performance of the second member 20.

1.1 First Member

The first member 10 is a cooling member for cooling the first current collector 31. The shape, structure and material of the first member 10 are not particularly limited as long as it is capable of cooling the first current collector 31. The first member 10 can be, for example, a plate-like member. Specifically, the first member 10 may be a cooling plate which removes heat from the first current collector 31. Alternatively, the first member 10 may be a cooling plate having passages of coolant. As will be described later, the first member 10 may be connected to a heat exchanger 50 (refer to FIG. 5). For example, when the first member 10 has coolant passages, the coolant passages may be connected to the heat exchanger 50.

As shown in FIG. 2, an intermediate member such as an exterior body 40 may be present between the first member 10 and the first current collector 31. Alternatively, the first member 10 may be in direct contact with the surface of the first current collector 31.

As shown in FIG. 2, the first member 10 may be provided on only one end side (a position facing the surface of the first current collector 31) of the laminate electrode body 30 in the lamination direction. Alternatively, the first member 10 may have a portion which protrudes from the position facing the surface of the first current collector 31, and, for example, the first member 10 may be present on the side surface side of the laminate electrode body 30 by bending the protruding portion (refer to FIG. 5).

The cooling performance of the first member 10 is greater than the cooling performance of the second member 20. The phrase "cooling performance of the first member 10" means the ability of the first member 10 to cool the first current collector 31. The phrase "cooling performance of the second member 20" means the ability of the second member 20 to cool the second current collector 32. In other words, the phrase "the cooling performance of the first member 10 is greater than the cooling performance of the second member 20" means that when the thermal conductivity and heat generation amount of the first current collector 31 are the same as the thermal conductivity and heat generation amount of the second current collector 32, the amount of heat removed from the first current collector 31 to the first member 10 per unit time is greater than the amount of heat removed from the second current collector 32 to the second member 20 per unit time. Note that as will be described later, the second member 20 need not necessarily be a cooling member, but rather may be, for example, an insulating member. When the second member 20 is an insulating member, the cooling performance of the first member 10 will naturally be higher than the cooling performance of the second member 20.

1.2 Second Member

The second member 20 may be a cooling member which cools the second current collector 32, or may be a non-cooling member which is not intended to cool the second current collector 32. The shape, structure, and material of the second member 20 are not particularly limited as long as the cooling performance thereof is less than that of the first member 10. The second member 20 may be a heat insulating member. For example, the second member 10 may be a plate-like insulating member for preventing the spread of fire. Alternatively, the second member 20 may be a resin frame for the retention of the laminate electrode body 30 or the exterior body 40. Note that in the present application, such a resin frame is also regarded as a type of heat insulating member.

As shown in FIG. 2, an intermediate member such as the exterior body 40 may be present between the second member 20 and the second current collector 32. Alternatively, the second member 20 may be in direct contact with the surface of the second current collector 32.

Note that the bipolar battery of the present disclosure may include a form in which an intermediate member A is present between the first member 10 and the first current collector 31 and an intermediate member B (A and B may be identical members or members of the same type or may be different members) is present between the second member 20 and the second current collector 32. When an intermediate member (s) is present on the first current collector 31 side and/or the second current collector 32 side in this manner, the cooling performance of the entire body including the intermediate members is compared between the first current collector 31 side and the second current collector 32 side. In other words, the cooling performance for the first current collector 31 exhibited by the first member 10 and the intermediate member A is higher than the cooling performance for the second current collector 32 exhibited by the second member 20 and the intermediate member B. Intermediate members may be present between the first member 10 and the first current collector 31 and between the second member 20 and the second current collector 32 as long as the cooling performance is higher on the first current collector 31 side than on the second current collector 32 side.

As shown in FIG. 2, the second member 20 may be provided only on the other end side (a position facing the surface of the second current collector 32) of the laminate electrode body 30 in the lamination direction. Alternatively, the second member 20 may have a portion which protrudes from the position facing the surface of the second current collector 32, and, for example, the second member 20 may be present on the side surface side of the laminate electrode body 30 by bending the protruding portion.

1.3 Laminate Electrode Body

The laminate electrode body 30 is arranged between the first member 10 and the second member 20. The bipolar battery 100 can be charged and discharged by the battery reaction in the laminate electrode body 30. As shown in FIG. 2, the laminate electrode body 30 comprises the first current collector 31 constituting a lamination direction end surface, the second current collector 32 constituting the other lamination direction end surface, the at least one bipolar current collector 33 arranged between the first current collector 31 and the second current collector 32, and a plurality of power generating elements 34 which are electrically connected in series via the bipolar current collector 33 between the first current collector 31 and the second current collector 32.

1.3.1 First Current Collector

The first current collector 31 constitutes a lamination direction end surface of the laminate electrode body 30, and is arranged between the first member 10 and the bipolar current collector 33. In other words, the first current collector 31 is the outermost current collector arranged more outwardly on the first member 10 side than the bipolar current collector 33 of the laminate electrode body 30.

The first current collector 31 may be constructed from metal foil or metal mesh. From the viewpoint of high handleability, the first current collector 31 may be metal foil. The first current collector 31 may be composed of a plurality of layers of metal foil. Examples of the metal constituting the first current collector 31 may include Cu, Ni, Cr, Au, Pt, Ag, Al, Fe, Ti, Zn, Co, and stainless steel. Some sort of coating layer may be included on the surface of the first current collector 31 to adjust the resistance thereof. When the first current collector 31 is composed of a plurality of layers of metal foil, some sort of layer may be included between the plurality of layers of metal foil. The thickness of the first current collector 31 is not particularly limited. It may be, for example, 0.1 μm or more or 1 μm or more, and may be 1 mm or less or 100 μm or less.

The first current collector may be a positive electrode current collector or may be a negative electrode current collector. When the first current collector 31 is a positive electrode current collector, the second current collector 32, which will be described later, is a negative electrode current collector, and when the first current collector 31 is a negative electrode current collector, the second current collector 32, which will be described later, is a positive electrode current collector.

1.3.2 First Tab

The first current collector 31 comprises a first tab 31a. During charging of the bipolar battery 100, electrical power is supplied to the power generating elements 34 via the first tab 31a, and during discharging of the bipolar battery 100, electrical power is discharged to the outside via the first tab 31a. In other words, Joule heat generation due to energization can occur in the first tab 31a during both charging and discharging of the bipolar battery 100.

The amount of heat generated by the first tab 31a during energization of the battery 100 varies in accordance with the material and shape of the first tab 31a (cross-sectional area, length, etc.), energization resistance with the members connected with the first tab 31a for transferring current (for example, increased electrical resistance due to welding), and the Joule heat generation amount of the members connected to the first tab 31a. The magnitude relationship between the amount of heat generated by the first tab 31a and the amount of heat generated by the second tab 32a can be confirmed by, for example, energizing the laminate electrode body 30.

The material of the first tab 31a may be the same as the material of the first current collector 31 or may be different. The tab 31a may be composed of a material having a high volume resistivity (electrical resistivity) as compared with that of the second tab 32a. The thickness of the first tab 31a may be the same as the thickness of the of the first current collector 31 or may be different. The cross-sectional area of the first tab 30 may be smaller than the cross-sectional area of the second tab 32a. It is sufficient that the first tab 31a have a shape which protrudes from the first current collector 31. As the protruding shape of the first tab 31a, various shapes such as a polygonal shape, a semicircular shape, and a linear shape can be adopted. The method for providing the first tab 31a on the first current collector 31 is not particularly limited. For example, the first tab 31a may be formed by cutting out a part of the first current collector 31, or may be formed by connecting the first tab 31a to the first current collector 31 by welding or the like.

The first tab 31a may have a shutdown mechanism. The phrase "shutdown mechanism" means a mechanism for cutting off the current or making it difficult for current to flow when the first tab 31a generates excessive heat, when excessive current flows through the first tab 31a, or when the battery 100 is in an abnormal charging (overcharging) state. Specific examples of the shutdown mechanism include a heat-fusing mechanism, a mechanism using a PTC element, and a metal plate reversing mechanism by gas pressure. The phrase "heat-fusing mechanism" means that a notch (cut) is provided at the base of tab 31a, and the notch (cut) is fused when the temperature rises or excessive current flows. The phrase "a mechanism using a PTC element" means that a PTC material (mixture of a resin and a conductive material; barium titanate; etc.) is arranged in a part of the current path of tab 31a, and when the temperature rises, the resistance of the PTC material rises, making it difficult for current to flow. The phrase "metal plate reversing mechanism by gas pressure" means that when the internal pressure of the battery rises during overcharging and etc., the internal pressure inverts the metal plate, thereby cutting off the current (refer to, for example, Japanese Unexamined Patent Publication No. 2018-77977). When the first tab 31a comprises a shutdown mechanism, the amount of heat generated during energization may be greater than when a shutdown mechanism is not provided.

1.3.2 Second Current Collector

The second current collector 32 constitutes the other lamination direction end surface of the laminate electrode body 30, and is arranged between the second member 20 and the bipolar current collector 33. In other words, the second current collector 32 is the outermost current collector arranged more outwardly on the second member 20 side than the bipolar current collector 33 of the laminate electrode body 30.

The second current collector 32 may be constructed from metal foil or metal mesh. From the viewpoint of high handleability, the second current collector 32 may be metal foil. The second current collector 32 may be composed of a plurality of layers of metal foil. Examples of the metal constituting the first current collector 31 may include Cu, Ni, Cr, Au, Pt, Ag, Al, Fe, Ti, Zn, Co, and stainless steel. Some sort of coating layer may be included on the surface of the second current collector 32 to adjust the resistance thereof. When the second current collector 32 is composed of a plurality of layers of metal foil, some sort of layer may be included between the plurality of layers of metal foil. The thickness of the second current collector 32 is not particularly limited. It may be, for example, 0.1 µm or more or 1 µm or more, and may be 1 mm or less or 100 µm or less.

1.3.3 Second Tab

The second current collector 32 comprises a second tab 32*a*. During charging of the bipolar battery 100, electrical power is supplied to the power generating elements 34 via the second tab 32, and during discharging of the bipolar battery 100, electrical power is discharged to the outside via the second tab 32*a*. In other words, Joule heat generation due to energization occurs in the second tab 32*a* during both charging and discharging of the bipolar battery 100. However, the second tab 32*a* has a small amount of heat generated during energization than the first tab 31*a*. Thus, even if the second tab 32*a* generates heat, a little or less heat diffuses into the second current collector 32.

The material of the second tab 32*a* may be the same as the material of the second current collector 32 or may be different. The thickness of the second tab 32*a* may be the same as the thickness of the second current collector 32 or may be different. It is sufficient that the second tab 32*a* have a shape which protrudes from the second current collector 32. As the protruding shape of the second tab 32*a*, various shapes such as a polygonal shape, a semicircular shape, and a linear shape can be adopted. The method for providing the second tab 32*a* on the second current collector 32 is not particularly limited. For example, the second tab 32*a* may be formed by cutting out a part of the second current collector 32, or may be formed by connecting the second tab 32*a* to the second current collector 32 by welding or the like.

The second tab 32*a* may or may not comprise a shutdown mechanism. When the first tab 31*a* comprises a shutdown mechanism, the second tab 32*a* may not comprise a shutdown mechanism.

1.3.4 Bipolar Current Collector

The bipolar current collector 33 is arranged between the first current collector 31 and the second current collector 32. In FIG. 2, an aspect in which a plurality of bipolar current collectors 33 are provided in the laminate electrode body 30 is shown, and the number of bipolar current collectors 33 in the laminate electrode body 30 is not particularly limited as long as it is at least one. However, the case in which a plurality of bipolar current collectors 33 are provided is considered to highly exhibit the effect of the technology of the present disclosure.

The bipolar current collector 33 may be constructed from metal foil or metal mesh. From the viewpoint of handleability, the bipolar current collector 33 may be metal foil. The bipolar current collector 33 may be composed of a plurality of layers of metal foil. Examples of the metal constituting the bipolar current collector 33 may include Cu, Ni, Cr, Au, Pt, Ag, Al, Fe, Ti, Zn, Co, and stainless steel. The metals constituting the first current collector 31, the second current collector 32, and the bipolar current collector 33 may be the same or may be different. Some sort of coating layer may be included on the surface of the bipolar current collector 33 to adjust the resistance thereof. Furthermore, when the bipolar current collector 33 is composed of a plurality of layers of metal foil, some sort of layer may be included between the plurality of layers of metal foil. The thickness of the bipolar current collector 33 is not particularly limited. For example, the thickness may be 0.1 µm or more and may be 1 µm or more, and may be 1 mm or less or 100 µm or less.

1.3.5 Power Generating Elements

It is sufficient that the power generating elements 34 be capable of causing a battery reaction to charge and discharge the bipolar battery 100. For example, as shown in FIG. 2, each power generating element 34 may comprise a first active material layer 34*a*, a second active material layer 34*b*, and an electrolyte layer 34*c* arranged between the first active material layer 34*a* and the second active material layer 34*b*. The plurality of power generating elements 34 are electrically connected in series via the bipolar current collector 33.

Among the first active material layer 34*a* and the second active material layer 34*b*, one is a positive electrode active material layer and the other is a negative electrode active material layer. When the first active material layer 34*a* is a positive electrode active material layer, the first current collector 31 described above can become a positive electrode current collector, and when the first active material layer 34*a* is a negative electrode active material layer, the current collector 31 described above can become a negative electrode current collector. Furthermore, when the second active material layer 34*b* is a positive electrode active material layer, the second current collector 32 described above can become a positive electrode current collector, and when the second active material layer 34*b* is a negative electrode active material layer, the second current collector 32 described above can become a negative electrode current collector.

The positive electrode active material layer comprises at least a positive electrode active material. When the bipolar battery 100 is a solid-state battery, in addition to a positive electrode active material, a solid electrolyte, a binder, and a conductive agent can be optionally further included. Furthermore, when the bipolar battery 100 is a liquid electrolyte-based battery, in addition to a positive electrode active material, a binder and conductive agent can be optionally further included. A known active material may be used as the positive electrode active material.

Between two materials having different potentials for occlusion and release (charging and discharging potentials) of a predetermined type of ions, the material demonstrating a noble potential can be used as the positive electrode active material and the material demonstrating a low potential can be used as a negative electrode active material, which is described later. For example, in the case of constituting a lithium ion battery, various lithium-containing composite oxides such as lithium cobalt oxide, lithium nickel oxide, $LiNi_{1/3}Co_{1/3}Mn_{1/3}O_2$, lithium manganate, and spinel-based lithium compounds can be used as the positive electrode active material. When the bipolar battery 100 is a solid state battery, the surface of the positive electrode active material may be coated with an oxide layer such as a lithium niobate layer, a lithium titanate layer, or a lithium phosphate layer. When the bipolar battery 100 is a solid state battery, the solid electrolyte is preferably an inorganic solid electrolyte. This is because the ionic conductivity thereof is higher than that of organic polymer electrolytes. This is also because it has excellent heat resistance as compared with organic polymer electrolytes. Further, this is because it has excellent rigidity as compared with organic polymer electrolytes, whereby the bipolar battery 100 can be more easily constructed. Examples of preferred inorganic solid electrolytes may include oxide solid electrolytes such as lithium lanthanum zirconate, LiPON, $Li_{1+x}Al_xGe_{2-x}(PO_4)_3$, Li—SiO-based glasses, and Li—Al—S—O-based glasses; and sulfide solid electrolytes such as $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. In particular, sulfide solid electrolytes are preferred, and sulfide solid electrolytes comprising $Li_2S$—$P_2S_5$ are more preferable. Examples of the binder included in the positive electrode active material layer may include butadiene rubber (BR) based binders, butylene rubber (IIR) based binders, acrylate butadiene rubber (ABR) based binders, polyvinylidene fluoride (PVdF) based binders, and polytetrafluoroethylene (PTFE) based binders. Examples of the conductive agent included in the positive electrode active material layer may include carbon materials such as acetylene black and Ketchen Black or metal materials such as nickel, aluminum, and stainless steel. The content of each component in the positive electrode active material layer may be the same as in the prior art. The shape of the positive electrode active material layer may also be the same as in the prior art. In particular, from the viewpoint of facilitating construction of the bipolar battery 100, a sheet-like positive electrode active material layer is preferred. The thickness of the positive electrode active material layer is not particularly limited. For example, the thickness may be 0.1 μm to 2 mm. The lower limit thereof may be 1 μm or more and the upper limit thereof may be 1 mm or less.

The negative electrode active material layer comprises at least a negative electrode active material. When the bipolar battery 100 is a solid state battery, in addition to the negative electrode active material layer, a solid electrolyte, binder, and conductive agent can further be optionally included. Furthermore, when the bipolar battery 100 is a liquid electrolyte-based battery, in addition to the negative electrode active material, a binder and a conductive agent can be optionally further included. A known active material may be used as the negative electrode active material. For example, when the battery is constituted as a lithium ion battery, a silicon-based active material such as Si, Si alloys, and silicon oxide; a carbon-based active material such as graphite or hard carbon; various oxide-based active materials such as lithium titanate; metallic lithium and lithium alloys can be used as the negative electrode active material. The solid electrolyte, the binder and the conductive agent can be appropriately selected and used from those exemplified for the positive electrode active material layer. The content of each component in the negative electrode active material layer may be the same as in the prior art. The shape of the negative electrode active material layer may also be the same as in the prior art. In particular, from the viewpoint of facilitating construction of the bipolar battery 100, a sheet-like negative electrode active material layer is preferred. The thickness of the negative electrode active material layer is not particularly limited. For example, the thickness may be 0.1 μm to 2 mm. The lower limit thereof may be 1 μm or more and the upper limit thereof may be 1 mm or less.

The electrolyte layer 34c comprises at least an electrolyte. When the bipolar battery 100 is a solid state battery, the electrolyte layer 34c can be a solid electrolyte layer comprising a solid electrolyte and optionally a binder. The solid electrolyte is preferably an inorganic solid electrolyte, as described above, and is particularly preferably a sulfide solid electrolyte. The binder can be appropriately selected and used from among those used for the positive electrode active material layer. The content of each component in the solid electrolyte layer may be the same as in the prior art. The shape of the solid electrolyte layer may also be the same as in the prior art. In particular, from the viewpoint of facilitating construction of the bipolar battery 100, a sheet-like solid electrode layer is preferred. In this case, the thickness of the solid electrolyte layer may be, for example, 0.1 μm to 2 mm. The lower limit thereof may be 1 μm and the upper limit thereof may be 1 mm. Conversely, when the bipolar battery 100 is a liquid electrolyte-based battery, the electrolyte layer 34c can comprise a liquid electrolyte and a separator. Known liquid electrolytes and separators may be used. Note that when comparing the case in which the electrolyte layer 34c is a liquid electrolyte layer and the case in which it is a solid electrolyte layer, in the case in which the electrolyte layer 34c is a solid electrolyte layer, construction of the bipolar battery 100 is considered to be easier.

The power generating elements 34 and laminate electrode body 30 can be produced by known methods. The number of the plurality of power generating elements 34 included in the laminate electrode body is not particularly limited. For example, the number of power generating elements 34 may be 2 to 1000. The lower limit thereof may be 10 or more, and the upper limit may be 300 or less.

Note that though the shape of the laminate surface (the surface shape of the first current collector 31) of the laminate electrode body 30 is illustrated as rectangular in FIGS. 1 and 2, the shape of the laminate surface of the laminate electrode body 30 is not limited thereto.

1.3.6 Other Members

In addition to the first member 10, the second member 20, and the laminate electrode body 30 described above, the bipolar battery 100 may comprise other members. For example, terminals connected to the tabs 31a, 32a may be provided. The terminals may be mechanically connected to tabs 31a and 32a so as to be detachable, or may be joined by welding.

As described above, the bipolar battery 100 may comprise an exterior body 40 for accommodating the laminate electrode body 30. In this case, the first member 10 may cool the first current collector 31 via the exterior body 40. The exterior body 40 may be a laminate film or may be a metal case. However, even if an exterior body 40 is not provided, the bipolar battery can be constructed. For example, the side surfaces of the laminate electrode body 30 in the lamination direction may be sealed with a resin, and the sealing resin, the first current collector 31, and the second current collector 32 may serve the same function as the extender body. In this case, the first member 10 may be in direct contact with the first current collector 31, whereby the first current collector 31 can be directly cooled.

As will be described later, the bipolar battery 100 may be connected to a heat exchanger 50. As a result, the cooling efficiency of the first current collector 31 by the first member 10 is further improved.

2. Bipolar Battery Stack

The technology of the present disclosure also includes an aspect as a bipolar battery stack. In other words, the bipolar battery stack of the present disclosure comprises a plurality of the bipolar batteries of the present disclosure described above. For example, the bipolar battery stack may be constructed by laminating a plurality of the bipolar batteries. The method for laminating the bipolar batteries is not particularly limited.

2.1 First Aspect

Figure 3:
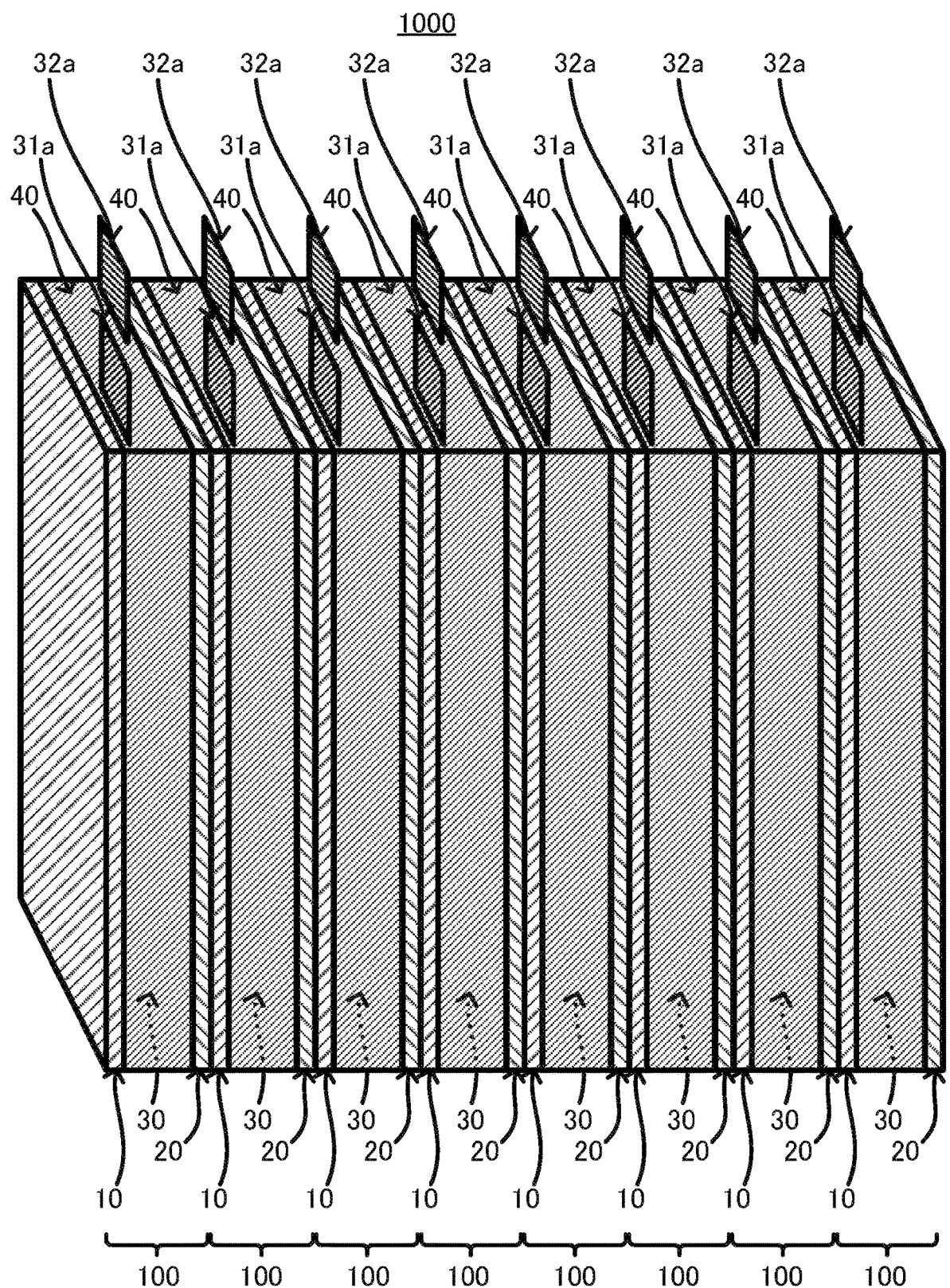
FIG. 3 is a schematic view showing an example of the appearance of a bipolar battery stack.

FIGS. 3 and 4A show a bipolar battery stack 1000 according to a first aspect. As shown in FIGS. 3 and 4A, in the bipolar battery stack 1000, the second member 20 of one bipolar battery 100 may be laminated on the first member 10 of another bipolar battery 100. In other words, in the bipolar battery stack 1000, one bipolar battery 100 and another bipolar battery 100, which are adjacent, may be laminated in the same direction.

2.2 Second Aspect

Figure 4B:
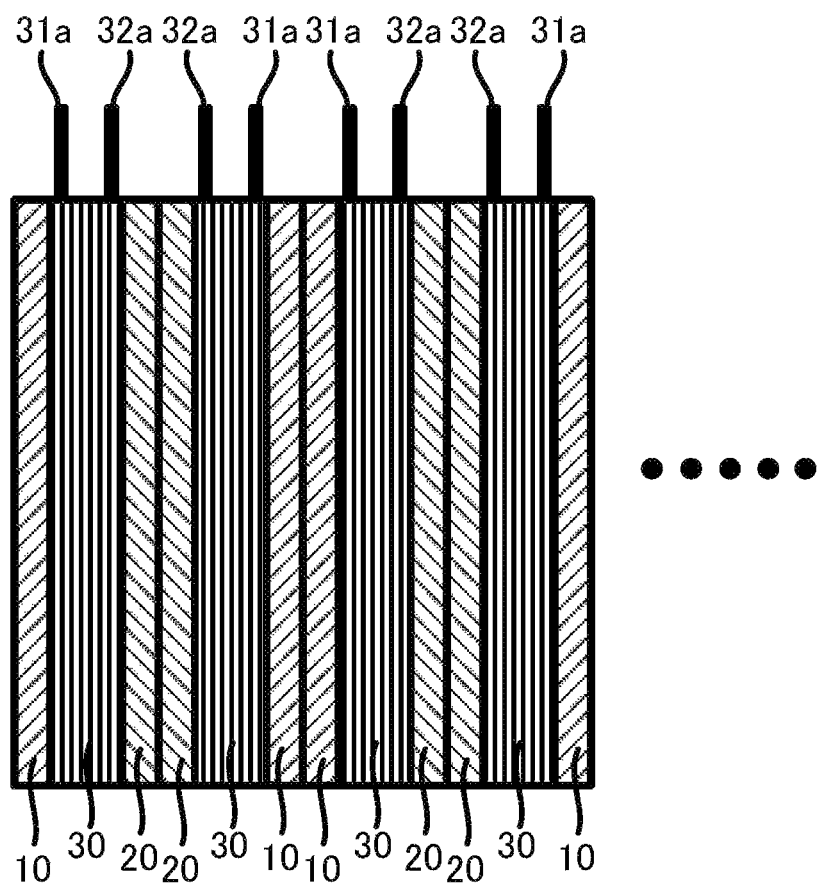
FIG. 4B is a schematic view detailing another example of the laminate structure of the bipolar battery stack. The exterior body has been omitted.

FIG. 4B shows a bipolar battery stack 2000 according to a second aspect. As shown in FIG. 4B, in the bipolar battery stack 2000, the first member 10 of one bipolar battery 100 may be laminated on the first member 10 of another bipolar battery 100. Furthermore, as shown in FIG. 4B, in the bipolar battery stack 2000, the second member 20 of one bipolar battery 100 may be laminated on the second member 20 of another bipolar battery 100. In other words, in the bipolar battery stack 2000, one bipolar battery 100 and another bipolar battery 100, which are adjacent, may be laminated in mutually opposite directions.

2.3 Third Aspect

Figure 4C:
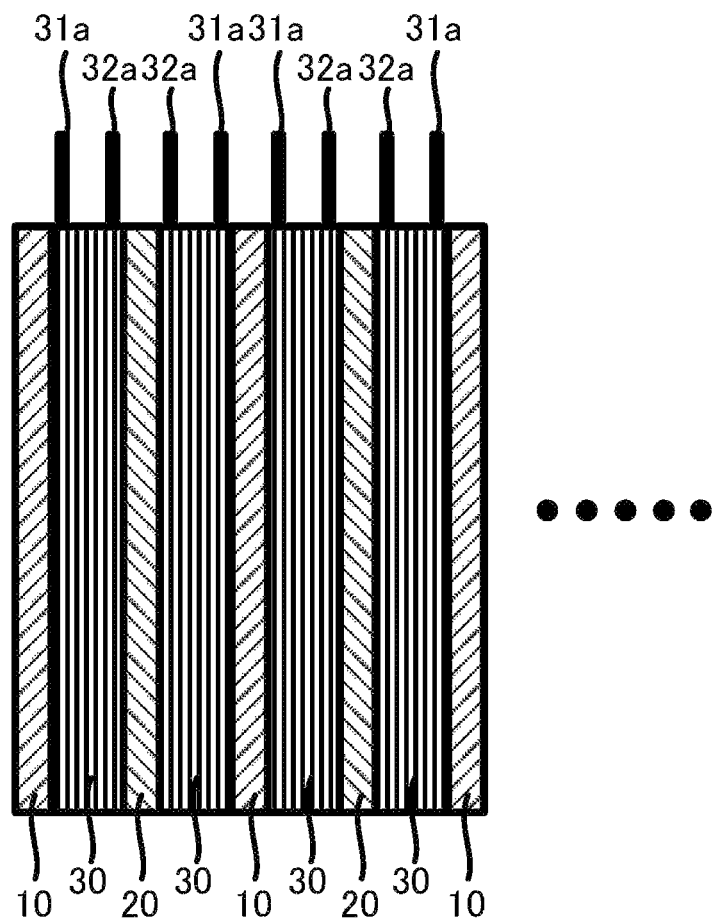
FIG. 4C is a schematic view detailing another example of the laminate structure of the bipolar battery stack. The exterior body has been omitted.

FIG. 4C shows a bipolar battery stack 3000 according to a third aspect. As shown in FIG. 4C, in the bipolar battery stack 3000, a first member 10 may be shared by one bipolar battery 100 and another bipolar battery 100. Furthermore, as shown in FIG. 4C, in the bipolar battery stack 300, a second member 20 may be shared by one bipolar battery 100 and another bipolar battery 100. In other words, in the bipolar battery stack 3000, first members 10 and second members 20 may be shared between adjacent bipolar batteries 100 while omitting some first members 10 and some second members 20.

2.4 Other Aspects

Figure 5:
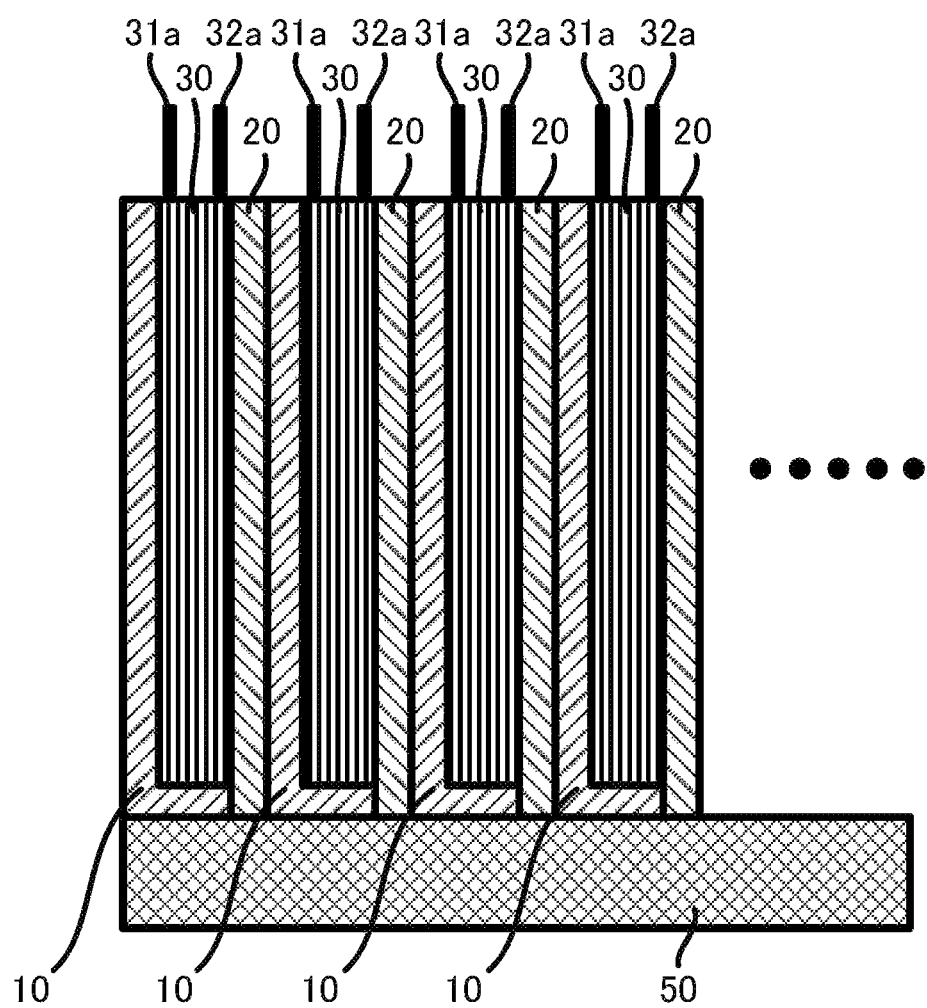
FIG. 5 is a schematic view detailing an example of the structure of a bipolar battery stack comprising a heat exchanger. The exterior body has been omitted.

As in the bipolar battery stack 4000 shown in FIG. 5, the first member 10 may be connected to a heat exchanger 50. For example, when the first member 10 has coolant passages, the coolant passages may be connected to the heat exchanger 50, whereby coolant may be circulated between the heat exchanger 50 and the first member 10. The location where the heat exchanger is connected in the bipolar battery stack is not particularly limited. Among the side surfaces (the surfaces other than the laminated surfaces) of the bipolar battery 100, when the surface on which tabs 31a, 32a protrude is the first side surface, the surface opposite to the first side surface is the second side surface, and the two side surfaces between the first side surface and the second side surface are the third side surface and the fourth side surface, the heat exchanger 50 may be connected to the second side surface of the bipolar battery 100, or the heat exchanger 50 may be connected to the third side surface or fourth side surface.

The bipolar battery stack may comprise arbitrary members other than those described above. For example, wiring or a stack case may be provided.

3. Effects

In conventional bipolar batteries, during energization of the battery, the tabs connected to the outermost current collectors generate heat, and this heat may diffuse from the tabs toward the interior of the electrode body via the outermost current collectors. The amount of heat generated during energization of the battery differs between the positive electrode side tab and the negative electrode side tab provided in the bipolar battery. For example, when one tab is composed of Al and the other tab is composed of Cu, and the shapes of both tabs are the same, since the electrical resistivity of Al is greater than that of Cu and the thermal conductivity of Al is less than that of Cu, the tab composed of Al has a greater amount of heat generated during energization and has a lower heat dissipation capacity than the tab made of Cu. Thus, when comparing the current collector connected to Al tab and the current collector connected to Cu tab, a significant amount of heat is conducted and diffused to the former current collector, and thermal deterioration of the electrode body is likely to occur in the vicinity of the former current collector. In connection thereto, according to the bipolar battery of the present disclosure, the outermost current collector (first current collector) connected to the tab (first tab) having a significant amount of amount of heat generated during energization can be appropriately cooled by the first member, which has high cooling performance. As a result, thermal deterioration of the laminate electrode body in the vicinity of the first current collector connected to the first tab, which generates significant amounts of heat, can be suppressed.

INDUSTRIAL APPLICABILITY

The bipolar battery and bipolar battery stack of the present disclosure is widely applicable, from small power sources such as those for mobile devices to large power sources, such as those for electric vehicles.

REFERENCE SIGNS LIST

10 first member
20 second member
30 laminate electrode body
31 first current collector
31a first tab
32 second current collector
32a second tab
33 bipolar current collector
34 power generating element
34a first active material layer
34b second active material layer
34c electrolyte layer
40 exterior body
50 heat exchanger
100 bipolar battery
1000, 2000, 3000, 4000 bipolar battery stack

The invention claimed is:

1. A bipolar battery stack, comprising a plurality of bipolar batteries, wherein
   each bipolar battery comprises a first member, a second member, and a laminate electrode body arranged between the first member and the second member, wherein
   the laminate electrode body comprises a first current collector constituting a lamination direction end surface, a second current collector constituting the other lamination direction end surface, at least one bipolar current collector arranged between the first current collector and the second current collector, and a plurality of power generating elements which are electrically connected in series via the bipolar current collector between the first current collector and the second current collector,
   the first current collector is arranged between the first member and the bipolar current collector,
   the second current collector is arranged between the second member and the bipolar current collector,
   the first current collector has a first tab,
   the second current collector has a second tab, an amount of heat generated by the first tab during energization of the battery is greater than an amount of heat generated by the second tab, the first member is a cooling member for cooling the first current collector, and a cooling performance of the first member is greater than a cooling performance of the second member, wherein the second member of each bipolar battery of the plurality of bipolar batteries is shared by one of the bipolar batteries and another of the bipolar batteries.

2. The bipolar battery stack according to claim 1, wherein the first tab of each bipolar battery of the plurality of bipolar batteries has a shutdown mechanism.

3. The bipolar battery stack according to claim 1, wherein the second member of each bipolar battery of the plurality of bipolar batteries is a heat insulating member.

* * * * *